Dec. 13, 1966     H. E. TRACY ETAL     3,291,489
MAGNETIC SEPARATOR AND MECHANICAL SEAL
Filed Jan. 14, 1963     2 Sheets-Sheet 1

HERBERT E. TRACY
LEE J. ALLEY
*INVENTORS.*

BY *Joseph R. Dwyer*

ATTORNEY.

Dec. 13, 1966  H. E. TRACY ETAL  3,291,489
MAGNETIC SEPARATOR AND MECHANICAL SEAL
Filed Jan. 14, 1963  2 Sheets-Sheet 2

HERBERT E. TRACY
LEE J. ALLEY
INVENTORS.

BY Joseph R. Dwyer

ATTORNEY.

United States Patent Office 3,291,489
Patented Dec. 13, 1966

3,291,489
MAGNETIC SEPARATOR AND
MECHANICAL SEAL
Herbert E. Tracy, Los Angeles, Calif., and Lee J. Alley, Cleveland, Ohio, assignors to Borg-Warner Corporation, Chicago, Ill., a corporation of Illinois
Filed Jan. 14, 1963, Ser. No. 251,322
1 Claim. (Cl. 277—15)

This invention relates, in general, to mechanical seals for sealing a rotating shaft in a housing, and in particular, to a combination of a mechanical seal having a circulation system for coolant-lubricant fluid pumped by the mechanical seal itself with a magnetic separator for removing metallic particles from the circulating fluid.

It is a general object of this invention to provide a mechanical seal having a circulating system for coolant-lubricant with a magnetic separator for removing metallic particles from the circulating fluid.

It is a specific object of this invention to provide a mechanical seal having its own cooling and lubricating system with a magnetic separator, which utilizes permanent magnets which includes a baffle for maximum efficiency of removal of particles and a removable cover for convenience of cooling.

Still another object of this invention is to provide a mechanical seal having its own circulating system, which is operated at a pressure differential not high enough to operate a cyclone efficiently, with a magnetic separator for removing magnetic particles in the fluid being circulated.

These and additional objects of this invention will become apparent from the following description when taken in connection with the accompanying drawings in which:

FIGURE 4 is an isometric view of one of the permanent magnets of the magnetic separator shown in the previous figures.

Figure 1:
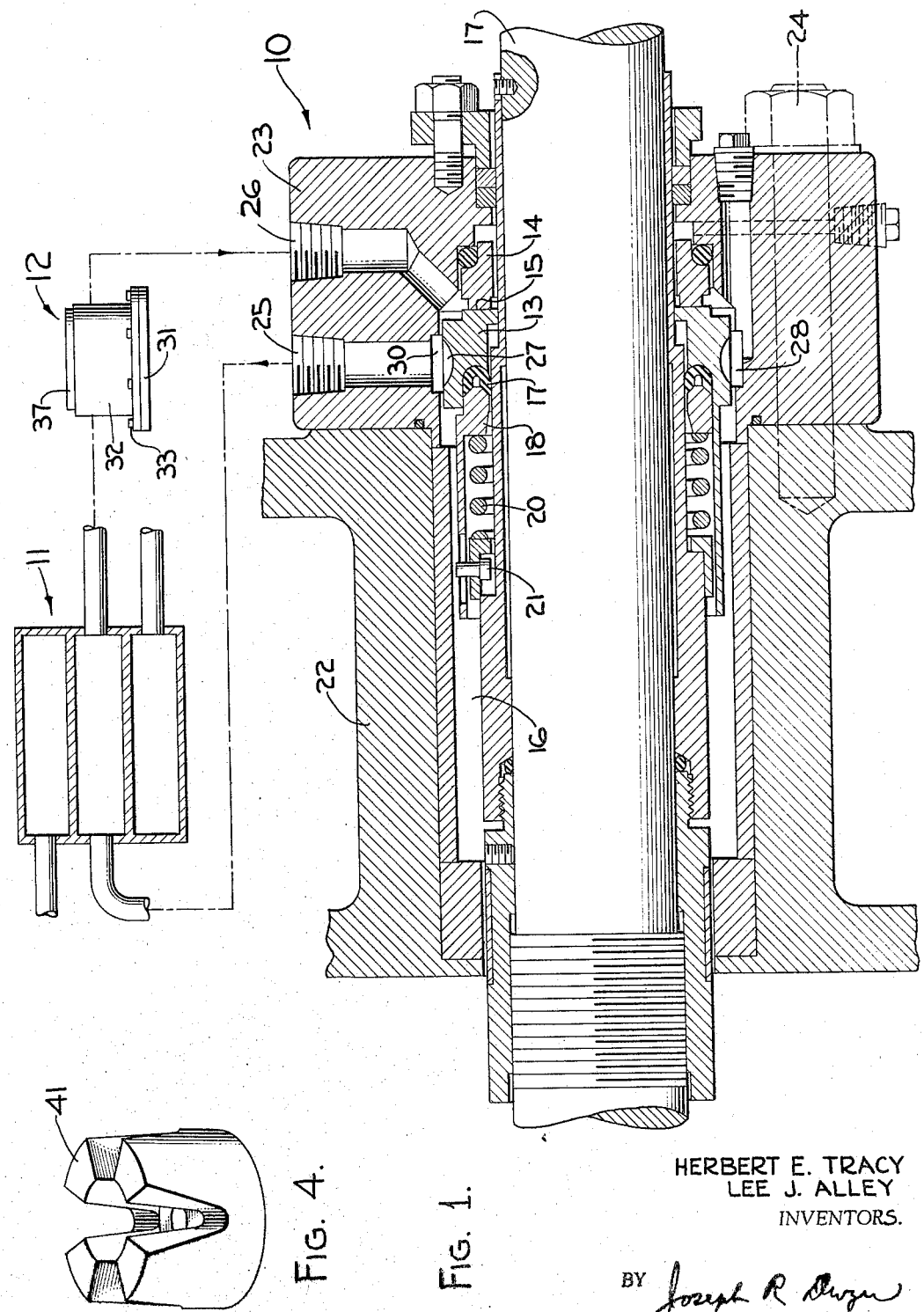
FIGURE 1 is a cross-sectional view of a mechanical seal with the circulating system thereof illustrated schematically.

Turning now to FIGURE 1, it can be seen that there is illustrated a mechanical seal indicated in its entirety as 10, which is connected to a heat exchanger, indicated in its entirety as 11 and to magnetic separator, indicated in its entirety as 12, so that fluid circulated by the mechanical seal, as will be explained in detail hereinafter, flows from the mechanical seal to the heat exchanger and thence to the magnetic separator and is returned to the mechanical seal.

The mechanical seal 10 comprises a rotatable ring 13 and stationary ring 14, each of which are provided with sealing faces, identified individually and collectively as 15, and can be of the conventional and known type, to prevent fluid in the mechanical seal chamber 16 from leaking out past the rotating shaft 17. The rotatable seal ring 13 is provided with a U shaped elastomer cup 17 and a back-up spring holder 18, spring loaded by spring 20, and connected through a connecting means, such as the pin and slot and sleeve combination, identified in its entirety as 21, to rotate with shaft 17. Since the function of the spring holder 18 and the connecting means 21 is conventional and well known, no further description is deemed necessary herein as, for example, described in U.S. Patent 2,824,759 of H. E. Tracy entitled Liquid Cooled Seal.

The sealing rings and their associated assembly are housed in a sleeve 22 of a pump or the like (not shown) to which a second sleeve member 23 is attached by any suitable means, as by bolts 24. The sleeve member 23 is provided with an outlet 24 and an inlet 26. The inlet 26 communicates directly with the seal faces 15, and the outlet communicates with rotatable sealing ring 13, and in particular, is in close proximity with pumping elements 27 on the rotatable sealing ring 13. The pumping elements 27 comprise in the embodiment illustrated, a plurality or transverse concave depressions on the periphery of the rotatable sealing ring 13, so as the ring 13 turns, fluid in the seal chamber 16 will be impelled around the annular pressure chamber 28 until it hits a deflection member 30, which in the embodiment illustrated is a magnetic insert located adjacent the outlet 25, so that as fluid is impelled by the depressions 27, the fluid is diverted out the outlet 25 and thence to the heat exchanger 11 and the magnetic separator 12.

Since the mechanical seal 10 is fully and adequately disclosed in the U.S. Patent 2,824,759 entitled Liquid Cooled Seal, supra, no further description is deemed necessary herein to understand the operation of the seal disclosed herein.

In that patent also there is a heat exchanger and reference is made to the heat exchanger disclosed therein as illustration of one of the heat exchangers that may be used. Reference is also made to the U.S. application for Letters Patent by Fernando G. Marrujo, Serial No. 816,909, filed May 29, 1959, entitled Heat Exchanger now U.S. Patent No. 3,100,523, issued August 13, 1963, of an illustration of a heat exchanger suitable for use in connection with the instant invention and most preferred.

Figure 2:
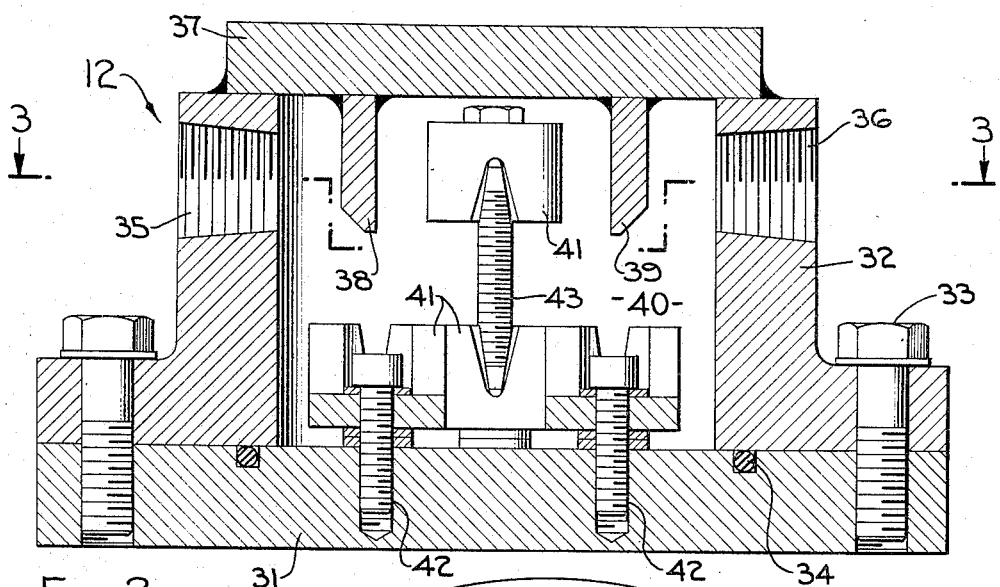
FIGURE 2 is a cross-sectional elevational view illustrating to advantage the magnetic separator forming part of this invention.
Figure 3:
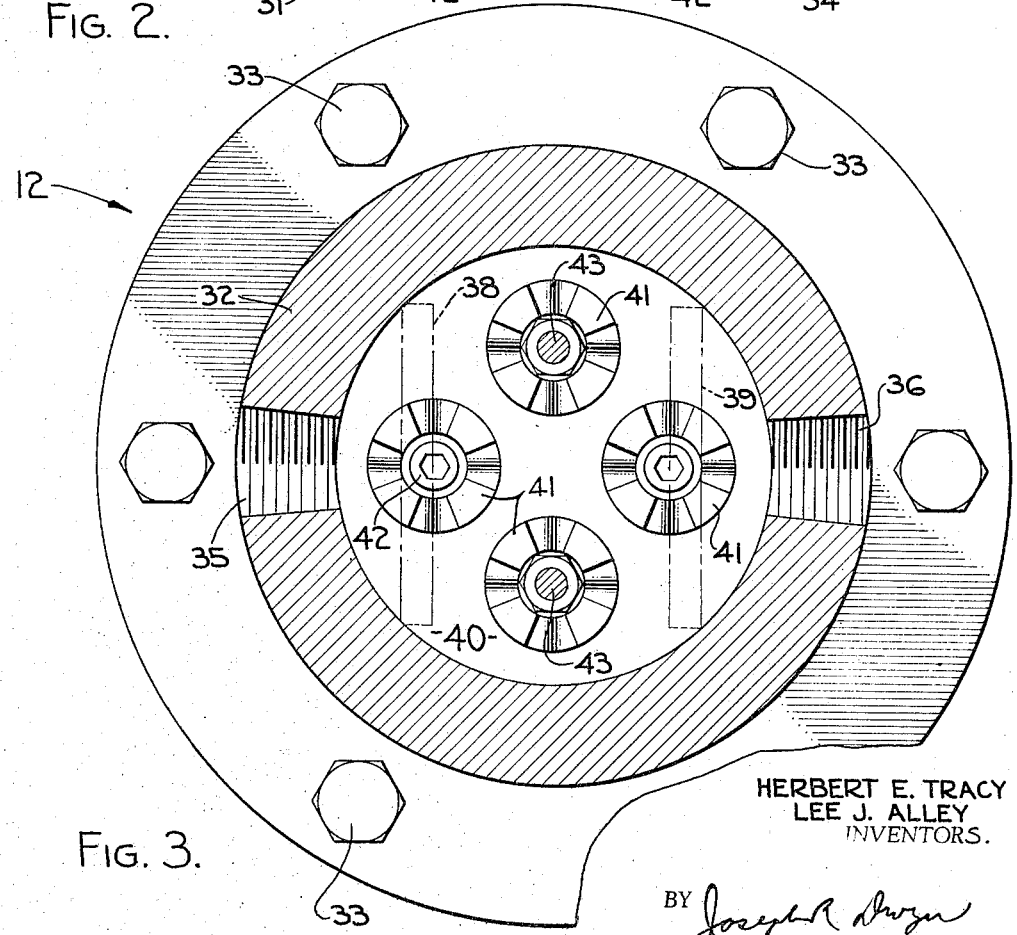
FIGURE 3 is a plan view taken along line 3—3 of FIGURE 2 and looking in the direction of the arrows.

Turning now to FIGURES 2 and 3 where the magnetic separator 12 is shown more fully. The magnetic separator comprises a base plate 31 and a cover plate 32, which is removably secured to the base by bolts 33 and sealed against leakage in any suitable manner as by O-ring seal 34. The cover member 32, being cup shaped, is provided near the top of its cylindrical sides with an inlet 35 which communicates with the outlet of the heat exchanger 11 as illustrated in FIGURE 1 and with an outlet 36 which communicates with the inlet 26 of the mechanical seal 10 also as illustrated in FIGURE 1.

The top 37 of cover 32 is provided with a pair of baffle plates 38 and 39 which extend inwardly into the chamber 40 of the magnetic seal and direct fluid entering the inlet 35 downwardly towards the base cover 31 so as to reduce the velocity of the fluid therein. The chamber 40 is provided with a plurality of permanent magnets, six (6) shown and identified as a group as 41, which are suitably attached to the base 31 by short bolts 42 and long bolts 43. The short bolts 42 affix four (4) of the permanent magnets 41 in close proximity to the base 31 and two (2) of the permanent magnets 41 adjacent the top 37 and between the baffle plates 38 and 39, as illustrated in FIGURE 2, so as to insure proper distribution of the various magnets and to provide a gap therebetween so as to obtain maximum efficiency of the magnets and to remove as much of the magnetic particles from the fluid as possible.

Thus, fluid entering the inlet 35 is directed by the baffle 38 downwardly towards the base 31, which causes a reduction in velocity of the fluid, so that the magnet can operate on the fluid and attract the magnetic particles therein. With the upper and lower magnets all of the fluid, being in disturbed or erratic flow as it flows through the magnetic separator and out the outlet 36, is under the influence of the magnets as much as possible.

With reference to FIGURE 4, it can be seen that the permanent magnets 41 are frusto-conical in shape and suitably apertured so as to receive the bolts 42 or 43. Since these permanent magnets are identical and the function is obvious, no further description is deemed necessary herein.

When the magnets become loaded with magnetic particles, the base 31 may be removed and the magnets cleaned or replaced and the base replaced. Also, the base 31 and the magnets could be replaced as a unit, if desired. It is to be noted that the removal and cleaning of the fluid does not require disconnection of the magnetic separator from the system inasmuch as the base is independent of the cover.

It is further to be noted that one of the features of the invention is that the magnetic separator is relatively small and thus does not require a support when used in combination with other elements, such as the heat exchanger, and that the piping itself connecting the inlet and outlet will support the weight thereof.

While the separator is shown on the outlet side of the heat exchanger as the preferred manner of connecting it in the system, it is possible that the separator could be connected at the inlet to the heat exchanger depending upon the operating temperatures of the particular mechanical seal with which it is used.

We claim:

In combination, a mechanical seal for sealing a rotating shaft within a housing, a heat exchanger, and a magnetic separator for removing magnetic particles from fluid circulating in said seal, said mechanical seal comprising, sealing means within the housing to prevent flow along the shaft outwardly thereof, said seal means including a part that rotates with the shaft, said part having impeller means formed on its periphery, a fluid inlet passage into said housing, a fluid outlet passage out of said housing, said fluid outlet passage being spaced from said fluid inlet passage, an annular chamber formed within the housing immediately adjacent said impeller means whereby, upon rotation of said rotating part, fluid entering said fluid inlet passage is impelled out said fluid outlet passage, said magnetic separator comprising, a casing, permanent magnets within the casing, a gap between the magnets, means for supporting said magnets in said casing, inlet and outlet connections leading to and from the gap to convey the fluid bearing the magnetic particles entering said inlet connection into contact with the magnets and out said outlet connection, said casing being made of separable parts, one part having said inlet and outlet connections and the other part comprising a base removable from said first mentioned part and arranged to permit removal of said magnets without disturbing the said inlet and outlet connections, a first conduit arranged to conduct fluid from said fluid outlet passage to said inlet connection, a second conduit arranged to conduct fluid from said outlet connection to said fluid inlet passage, whereby the fluid that is impelled out of said fluid outlet passage is conveyed into contact with said magnets and is returned to said fluid inlet passage, and said heat exchanger being arranged to cool the fluid flowing through one of said conduits.

References Cited by the Examiner

UNITED STATES PATENTS

| | | | |
|---|---|---|---|
| 1,989,349 | 1/1935 | Coherly | 210—168 X |
| 2,217,329 | 10/1940 | Bentley | 210—168 X |
| 2,452,220 | 10/1948 | Bower | 210—222 |
| 2,649,318 | 8/1953 | Skillman. | |
| 2,823,803 | 2/1958 | Sinclair et al. | 210—222 |
| 2,824,759 | 2/1958 | Tracy | 277—15 |
| 2,996,162 | 8/1961 | Lehide. | |

REUBEN FRIEDMAN, *Primary Examiner.*

F. W. MEDLEY, *Assistant Examiner.*